US012708954B2

(12) United States Patent
Juliusson et al.

(10) Patent No.: US 12,708,954 B2
(45) Date of Patent: Aug. 18, 2026

(54) DETECTING WELD START EVENT BASED ON TIME DERIVATIVE OF WELD VOLTAGE

(71) Applicant: The ESAB Group, Inc., North Bethesda, MD (US)

(72) Inventors: Lars David Leif Juliusson, Västra Frölunda (SE); Karl Jakob Erik Lennartsson, Gothenburg (SE); Patrik Waldemar Wadström, Kungälv (SE); Bo Daniel Lennartsson, Örebro (SE)

(73) Assignee: THE ESAB GROUP, INC., North Bethesda, MD (US)

( * ) Notice: Subject to any disclaimer, the term of this patent is extended or adjusted under 35 U.S.C. 154(b) by 745 days.

(21) Appl. No.: 18/187,204

(22) Filed: Mar. 21, 2023

(65) Prior Publication Data

US 2024/0316668 A1 Sep. 26, 2024

(51) Int. Cl.
*B23K 9/067* (2006.01)
*B23K 9/095* (2006.01)

(52) U.S. Cl.
CPC ............ *B23K 9/067* (2013.01); *B23K 9/0953* (2013.01); *B23K 9/0956* (2013.01)

(58) Field of Classification Search
CPC ...... B23K 9/067; B23K 9/0671; B23K 9/095; B23K 9/0953; B23K 9/0956; B23K 9/167; B23K 9/173
See application file for complete search history.

(56) References Cited

U.S. PATENT DOCUMENTS 4,972,064 A 11/1990 Stava
6,025,573 A 2/2000 Stava
6,248,976 B1 6/2001 Blankenship
7,598,474 B2 10/2009 Hutchison et al.
8,742,280 B2 6/2014 Vogel
(Continued)

FOREIGN PATENT DOCUMENTS

DE 102020102303 A1 8/2021
EP 1419027 B1 5/2004
(Continued)

OTHER PUBLICATIONS

'Derivative'. Wikipedia [online]. 2020, [retrieved on 2025-11-25]. Retrieved from the Internet: <URL:https://web.archive.org/web/20201122033324/https://en.wikipedia.org/wiki/Derivative> (Year: 2020).*

(Continued)

*Primary Examiner* — Elton K Wong
(74) *Attorney, Agent, or Firm* — Edell, Shapiro & Finnan

(57) ABSTRACT

A method performed in a welding or cutting system configured to deliver weld power to an electrode tip extending from a torch to create an arc on a workpiece, comprises: sampling a sensed voltage indicative of a weld voltage provided to the electrode tip, to produce voltage values; computing a time derivative of the voltage values to produce voltage derivative values that represent a contact resistance between the electrode tip and the workpiece; and upon detecting a decrease in the voltage derivative values from above a time-derivative threshold to below the time-derivative threshold as an indication of a weld start event, increasing the weld power supplied to the electrode tip to initiate the arc on the workpiece.

20 Claims, 6 Drawing Sheets

(56) References Cited

U.S. PATENT DOCUMENTS

| | | | | |
|---|---|---|---|---|
| 10,239,146 | B2 | 3/2019 | Davidson et al. | |
| 10,730,131 | B2 | 8/2020 | Aberg et al. | |
| 10,799,972 | B2 | 10/2020 | Hoeger et al. | |
| 10,857,611 | B2 | 12/2020 | Vogel | |
| 11,383,317 | B2 | 7/2022 | Davidson et al. | |
| 2004/0074884 | A1* | 4/2004 | Butler .................. | B23K 9/0953 219/124.01 |
| 2006/0138115 | A1 | 6/2006 | Norrish et al. | |
| 2013/0126498 | A1 | 5/2013 | Hsu et al. | |
| 2020/0238418 | A1* | 7/2020 | Hutchison ............ | B23K 9/0956 |
| 2020/0361015 | A1 | 11/2020 | Aberg et al. | |
| 2021/0039185 | A1 | 2/2021 | Hoeger et al. | |
| 2022/0055135 | A1 | 2/2022 | Satou et al. | |
| 2022/0362875 | A1 | 11/2022 | Massey, Jr. et al. | |

FOREIGN PATENT DOCUMENTS

| | | | |
|---|---|---|---|
| EP | 2533929 | B1 | 12/2012 |
| EP | 3507055 | B1 | 7/2019 |
| JP | 6796361 | B2 | 12/2020 |

OTHER PUBLICATIONS

Notification of Transmittal of International Search Report and Written Opinion including International Search Report and Written Opinion for International Application No. PCT/US2024/018465, mailed Aug. 21, 2024, 13 pages.

* cited by examiner

DETECTING WELD START EVENT BASED ON TIME DERIVATIVE OF WELD VOLTAGE

TECHNICAL FIELD

The present disclosure relates to detecting a weld start in a welding or cutting system.

BACKGROUND

In an arc welding system, a power supply provides weld power (including weld voltage and weld current) to a torch to strike an arc on a workpiece to perform a welding operation. Prior to starting the welding operation, the torch is held apart from the workpiece, which creates an open circuit. To start welding, an electrode tip extending through the torch is brought into contact with the workpiece, which represents "weld start" or a "weld start event." Once weld start is detected, the power supply is commanded to ramp up the weld current quickly to strike the arc. It is important to detect weld start quickly and accurately to avoid a delay between when the electrode tip contacts the workpiece and when the weld current is ramped up to create the arc. Conventional techniques used to detect weld start can be complex and prone to undesired delay in detecting weld start.

DESCRIPTION OF EXAMPLE EMBODIMENTS

Overview

In an embodiment, a method performed in a welding or cutting system configured to deliver weld power to an electrode tip extending from a torch to create an arc on a workpiece comprises: sampling a sensed voltage indicative of a weld voltage provided to the electrode tip to produce voltage values; computing a time derivative of the voltage values to produce voltage derivative values that represent a contact resistance between the electrode tip and the workpiece; and, upon detecting a decrease in the voltage derivative values from above a time-derivative threshold to below the time-derivative threshold as an indication of a weld start, increasing the weld power supplied to the electrode tip to initiate the arc on the workpiece.

EXAMPLE EMBODIMENTS

Figure 1:
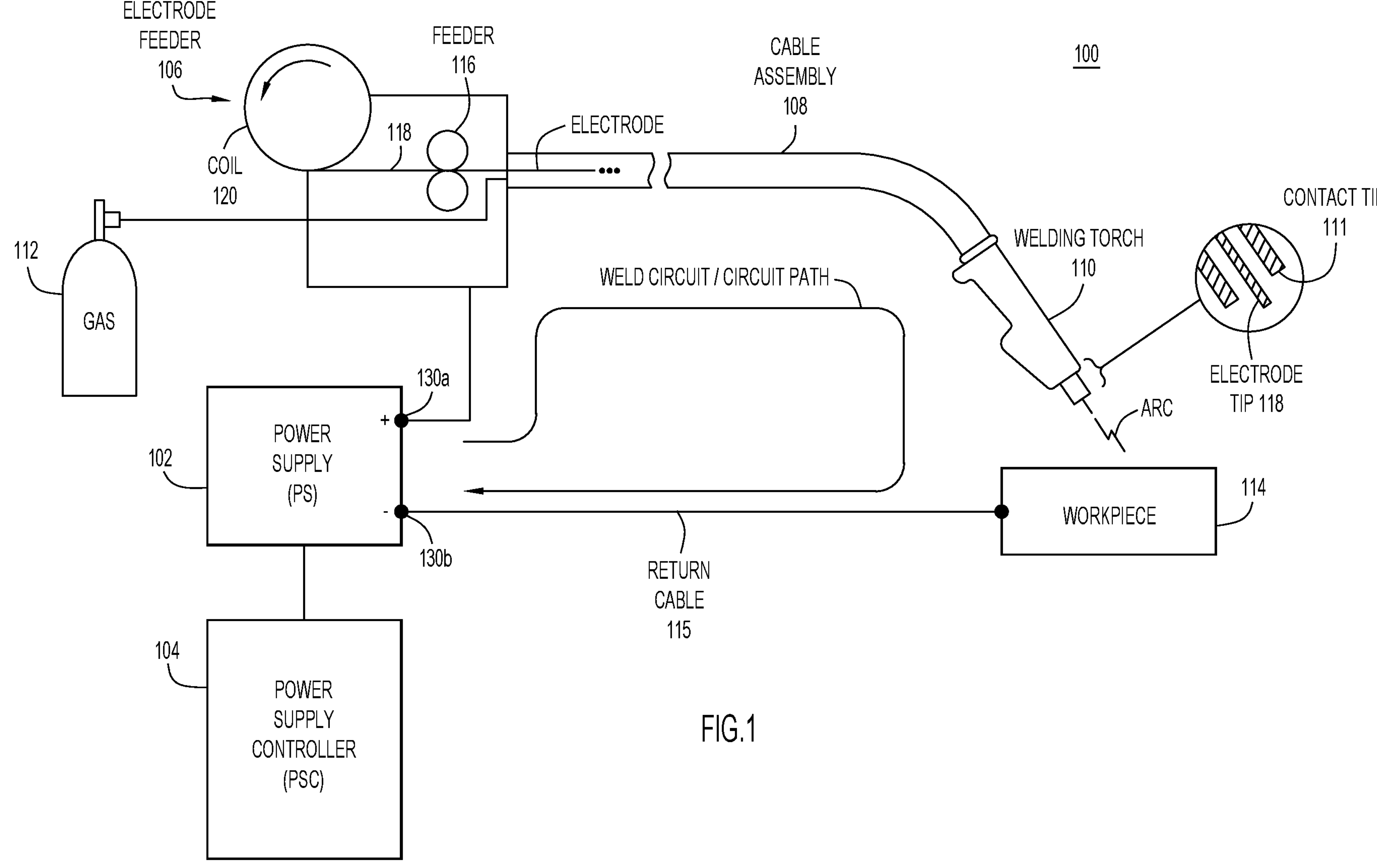
FIG. 1 is an illustration of an example welding or cutting system in which embodiments directed to detecting weld start based on time derivative values of a weld voltage (i.e., voltage derivative values) may be implemented.

With reference to FIG. 1, there is an illustration of an example metal inert gas (MIG)/metal active gas (MAG) welding system 100, in which embodiments directed to detecting weld start based on a time derivative of a weld voltage (i.e., a voltage derivative) may be implemented. The embodiments are presented in the context of MIG/MAG welding by way of example only. It is understood that the embodiments may be employed generally in any known or hereafter developed welding environments, such as, but not limited to, tungsten inert gas (TIG) welding, flux cored arc welding (FCAW), shielded metal arc welding (SMAW) or stick welding, submerged arc welding (SAW), and so on. Additionally, the embodiments may be employed equally in a plasma cutting apparatus, i.e., a cutting system. Thus, welding system 100 may also be referred to as a "welding or cutting system." In the example shown in FIG. 1, welding system 100 includes: a power supply 102; a power supply controller (PSC) 104 coupled to and configured to control the power supply; a wire electrode feeder 106 coupled to the power supply; a cable assembly 108 coupled to the wire electrode feeder 106; a torch 110 coupled to the cable assembly 108 and having a sturdy metal contact tip 111 that extends from an end of the torch 110; a gas container 112 coupled to the cable assembly 108; and a workpiece 114 coupled to the power supply through at least a return path/cable 115. In the ensuing description, the terms "weld" and "welding" are synonymous and interchangeable. Also, the terms "weld" and "welding" refer broadly to both welding and plasma cutting systems and operations. In the context of arc welding, torch 110 may be referred to as a "welding torch" or "welding gun." In the context of arc cutting, torch 110 may be referred to as a "cutting torch." Thus, as used herein, the term "torch" means either a welding torch (or welding gun) or a cutting torch, depending on context.

Wire electrode feeder 106 includes a feeder 116 to feed a consumable electrode from a coiled wire electrode 120 through cable assembly 108 and through contact tip 111 of torch 110, which is in electrical contact with the electrode. Under control of PSC 104, power supply 102 generates weld power that drives the welding (or cutting) process/operation. In welding operations that involve a pulsed or periodic waveform, the weld power typically includes a series of weld current pulses. Power supply 102 provides the weld power from an output terminal 130*a* of the power supply to the wire electrode, through feeder 116, cable assembly 108, and torch 110, while the cable assembly 108 also delivers a shielding gas from gas container 112 to the torch. Return path/cable 115 provides an electrical return path from workpiece 114 to an input terminal 130*b* of power supply 102. The aforementioned components comprise a circuit path or weld circuit from output terminal 130*a* to input terminal 130*b* of power supply 102, through wire electrode feeder 106, cable assembly 108, torch 110, workpiece 114, and return path/cable 115.

During a welding operation, an electrode tip 118 of the electrode is brought into contact or near contact with workpiece 114, and the weld power (i.e., current and voltage) supplied by power supply 102 to the torch 110 creates an arc between workpiece 114 and electrode tip 118 (also referred to as an "electrode stick") extending through the contact tip. To control the welding process, PSC 104 controls power supply 102 to generate the weld power (e.g., current) at a desired level for the welding process, based on feedback in the form of measurements of the current and voltage (e.g., arc voltage) supplied by the power supply to the welding process. The measurements may be produced by current and voltage sense points in power supply 102 and/or at sense points that are remote from the power supply, such as in cable assembly 108 or torch 110.

Figure 2:
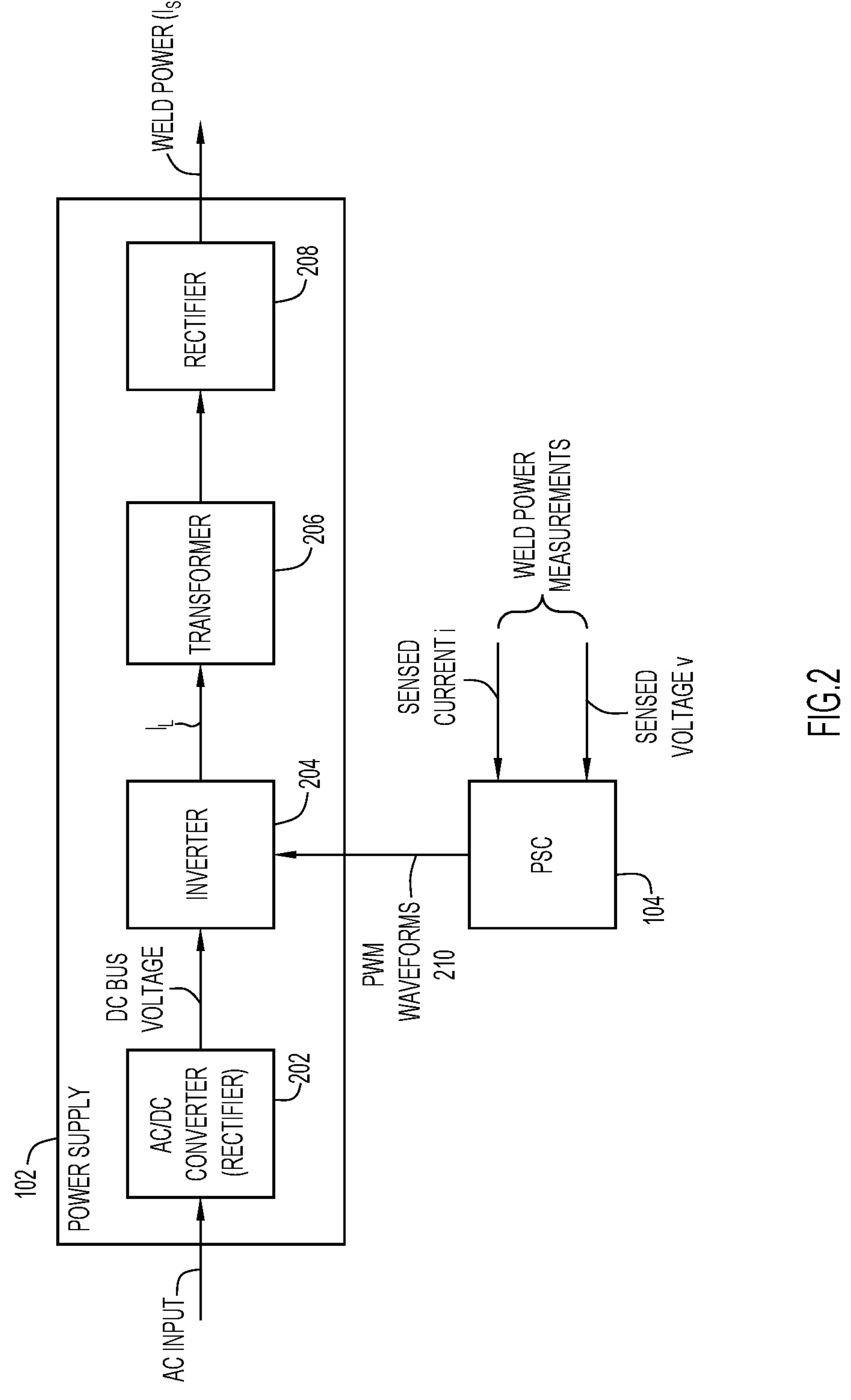
FIG. 2 is a block diagram of an example power supply and an example power supply controller (PSC) of the welding or cutting system.

FIG. 2 is a block diagram of power supply 102 with PSC 104, according to an embodiment. Power supply 102 includes an AC/DC converter 202 to receive AC input power (e.g., from AC mains or a generator), a power inverter (referred to simply as an "inverter") 204, a high-frequency transformer 206, and a rectifier 208 coupled to one another. AC/DC converter 202 includes, for example, a diode rectifier to convert the AC input power to a constant, rectified DC voltage (also referred to as a DC "bus" voltage), and provide the DC bus voltage to an input of inverter 204. Under control of PSC 104, inverter 204, transformer 206, and rectifier 208 collectively operate as a weld process regulator to convert the DC bus voltage to a desired weld power supplied by power supply 102 for a welding operation.

Inverter 204 comprises a set of high-speed semiconductor switching devices (i.e., power switches) that are pulse width modulated (i.e., switched on and off at a switching frequency) responsive to pulse width modulation (PWM) waveforms 210 (also referred to as "PWM signals"), generated by PSC 104 and applied to control terminals of the switching devices, to convert the DC bus voltage to an AC (power) signal or waveform including a voltage and a primary current IL that flows into transformer 206. Such operation is referred to as "PWM operation" of inverter 204. Inverter 204 may include a four-quadrant inverter, such as an H-bridge inverter, for example. In other examples, other types of inverters may be employed. Example switching frequencies may be in a range from 1 kHz-100 kHz, although other switching frequencies above and below this range may be used. Inverter 204 supplies the AC signal to transformer 206. Transformer 206 converts the voltage and current of the AC signal from inverter 204 to a transformed AC signal having desired levels of a voltage and a secondary current Is for the welding operation, and supplies the transformed AC signal to rectifier 208. Rectifier 208 rectifies the transformed AC signal to produce the weld power and supplies the same to the welding process.

Welding system 100 includes a current sense point to provide a sensed or measured current i to PSC 104. Current i is indicative of the weld current supplied to weld torch 110 during a weld operation and when welding system 100 is idle and not actively engaged in the welding operation. Welding system 100 includes a voltage sense point to provide a sensed or measured voltage v to PSC 104. Voltage vis indicative of the weld voltage supplied to weld torch 110 during a weld operation and when power supply is welding system 100 is idle and not actively engaged in the welding operation. The current and voltage sense points may be located in or near the sequential stages of power supply 102, or may be implemented remotely from the power supply. Together, current i and voltage v represent measurements of weld power supplied by power supply 102 to torch 110 for a welding process. That is, together, current i and voltage v represent weld power measurements. To control the weld power generated by power supply 102, PSC 104 generates and controls (e.g., dynamically adjusts) PWM waveforms 210 applied to inverter 204 based at least in part on the weld power measurements. For example, PSC 104 may increase duty cycles and thus on-times of PWM waveforms 210 applied to inverter 204 to increase the weld power, and vice versa. In this way, power supply 102 and PSC 104 implement a feedback control loop to control PWM waveforms 210 based on current i and voltage v.

Figure 3:
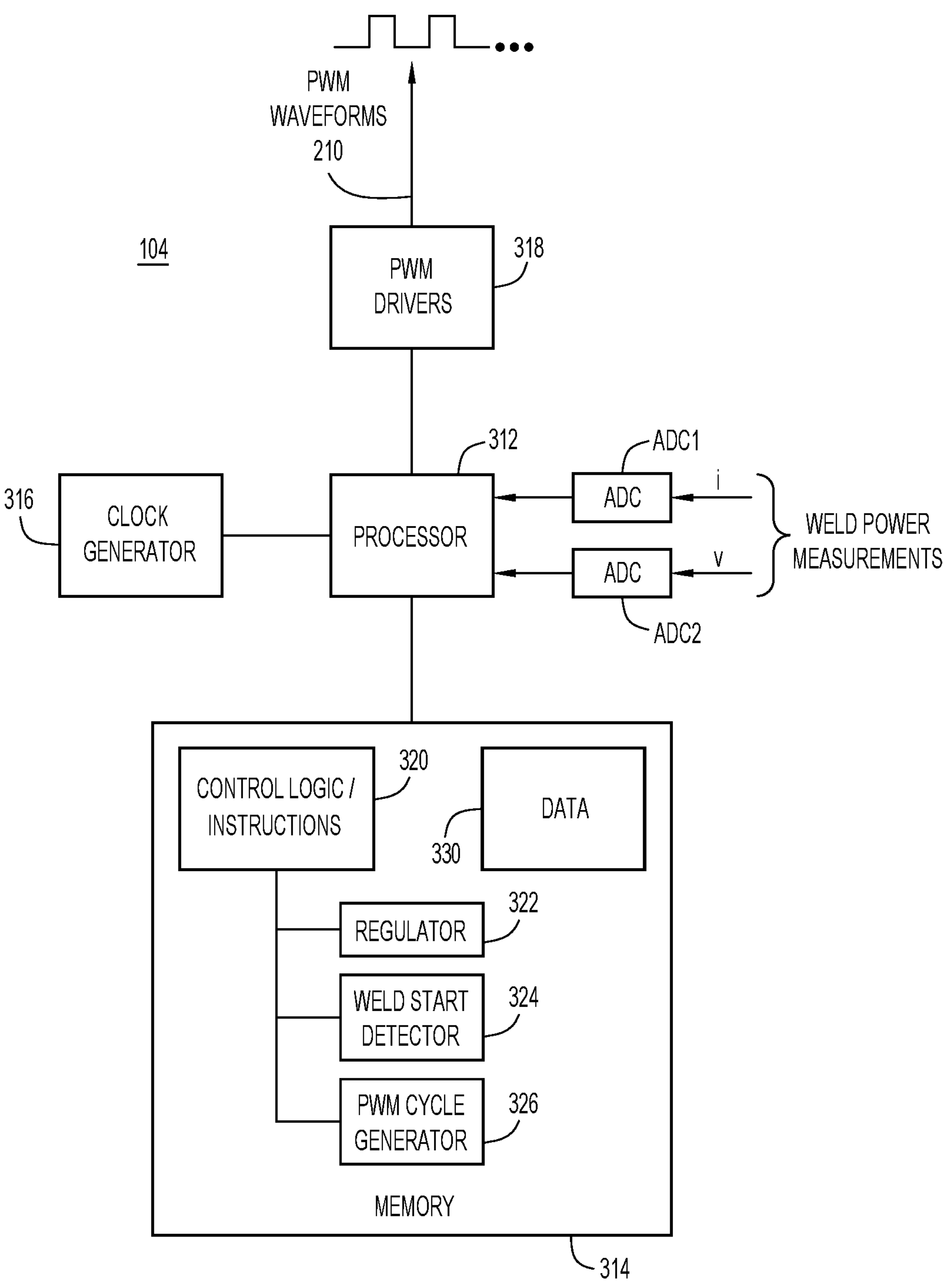
FIG. 3 is a block diagram of the PSC according to an embodiment.

FIG. 3 is a block diagram of PSC 104 (also referred to as a "controller") according to an embodiment. As mentioned above, PSC 104 receives the weld power measurements (e.g., sensed current i and sensed voltage v) and generates PWM waveforms 210 based in part on the weld power measurements. PSC 104 includes an analog-to-digital converter (ADC) ADC1, an ADC ADC2, a processor 312 (e.g., a microcontroller) (which may be implemented in hardware, software, or a combination thereof), a memory 314, a clock generator 316, and PWM drivers 318 coupled with each other. Clock generator 316 generates a clock signal (e.g., a clock waveform that cycles on and off) and timing signals used to drive other components of PSC 104. ADC1 samples current i to produce digitized current samples or values of current i (i.e., current values), and provides the same to processor 312. Similarly, ADC2 samples voltage v to produce digitized voltage values of voltage v (i.e., voltage values), and provides the same to processor 312. ADC1 and ADC2 may produce the current values and the voltage values at a sample rate in the MHz range, for example. Together, the current values and the voltage values represent the weld power measurements in digitized form, and provide real-time feedback from the welding process. The current values and the voltage values may also be referred to as "current samples" and "voltage samples," respectively. In some arrangements, ADC1 and ADC2 may be external to PSC 104.

Memory 314 stores non-transitory computer readable program instructions/control logic 320 that, when executed by processor 312, cause the controller to perform the operations described herein. Processor 312 executes control logic 320 to generate and control PWM waveforms 210 based on the weld power measurements (e.g., the current values and the voltage values). Processor 312 provides PWM waveforms 210 to power supply 102 through PWM drivers 318. To this end, control logic 320 may include logic to implement a regulator 322 to regulate weld power during the welding process, a weld start detector 324 to detect weld start according to embodiments presented herein, and a PWM cycle generator 326 to generate PWM waveforms 210 as commanded by the regulator and the weld start detector.

Memory 314 also stores data 330 used and produced by processor 312. In embodiments, components of PSC 104, including the ADCs, the processor, the memory, the clock generator, and the PWM drivers, may include electronic circuitry such as, for example, programmable logic circuitry, field-programmable gate arrays (FPGA), or programmable logic arrays (PLA) configured to store and execute the computer readable program instructions, which may include microcode, firmware, and so on.

Embodiments directed to detecting weld start are now described. Returning to FIG. 1, an operator may perform welding of workpiece 114 in multiple stages. In a pre-welding stage, while the operator holds torch 110 in a first position that is separated from workpiece 114, there is an open circuit (and a correspondingly high resistance) between output terminal 130*a* and input terminal 130*b* of power supply 102. The open circuit/high resistance prevents weld current (of the weld power) from flowing to torch 110, i.e., the weld current should be zero. During the pre-welding stage, PSC 104 may control power supply 102 to operate in an idle state or "voltage mode" to generate an idle voltage having a relatively low duty cycle (responsive to a relatively low duty cycle of PWM waveform 210 applied to power supply 102), and which appears as an open-circuit voltage at contact tip 111/electrode tip 118 of torch 110. In the idle state, power supply 102 does not supply any significant amount of weld current. Ideally, the high resistance between torch 110 and workpiece 114 results from an air gap separating the two; however, in some non-ideal situations, the high resistance may result from accidental occurrences for which an arc should not be initiated, such as when a gloved hand of the operator becomes accidentally trapped between torch 110 and workpiece 114, for example. In either case, the existence of the open circuit/high resistance should prevent striking an arc.

The next stage starts the weld operation. The weld operation starts when the operator moves torch 110 to a second position that brings electrode tip 118 into direct contact with workpiece 114 to establish a sufficiently low resistance (i.e., a "good enough" ohmic connection) between the two to strike an arc. This event is "weld start." At weld start, contact between electrode tip 118 and workpiece 114 closes the circuit between output terminal 130*a* and input terminal 130*b*, which results in a marked dip in the resistance of the weld circuit and a corresponding dip in the open-circuit voltage (e.g., idle voltage). At weld start, a fast ramp up of the weld current (of the weld power) is desirable. Specifically, power supply 102 should increase the level of the weld current as rapidly as possible to strike an arc. It is important to detect weld start quickly to avoid a delay in initiating the arc.

Several techniques used to detect weld start can produce suboptimal results. A first technique detects a dip in the resistance directly to indicate weld start. The first technique is slow and difficult to perform because there is no current (or approximately zero current) at weld start on which to base measurements of the resistance. A second technique detects a dip in the weld voltage as an indirect indicator of the dip in resistance; however, the weld voltage can be noisy. Moreover, voltage regulation performed by welding system 100 can counteract the voltage dip. Detecting weld start based on the noisy, regulated, weld voltage is slow because extra headroom is needed to avoid false triggers, and the detections can yield inconsistent and inaccurate weld start indications.

Embodiments presented herein overcome the aforementioned disadvantages. The embodiments detect weld start quickly and accurately using a time derivative of a voltage (e.g., a sensed voltage) indicative of the weld voltage. The time derivative of the voltage (referred to simply as the "voltage derivative" du/dt) provides a fast and definitive indicator of weld start. The embodiments minimize a time delay between when (i) a resistance of the weld circuit dips to a level sufficiently low to strike an arc due to direct contact between contact tip 111/electrode tip 118 and workpiece 114, and (ii) a ramp up of weld current to initiate the arc occurs. The embodiments are described in detail below in connection with FIGS. 4-6.

Figure 4:
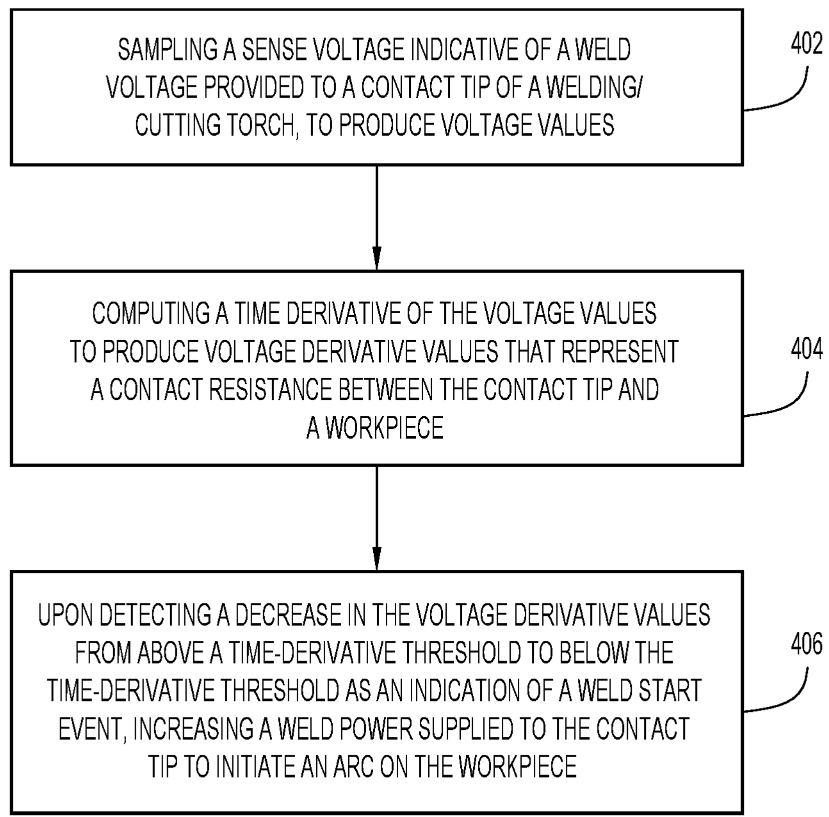
FIG. 4 is a flowchart of example operations employed by the welding or cutting system to detect weld start based on a time derivative of a weld voltage.

FIG. 4 is a flowchart of example operations 400 employed by welding system 100 to (or cutting system) detect weld start based on the time derivative of the weld voltage. During operations 400, power supply 102 supplies a voltage to contact tip 111/electrode tip 118 of torch 110 under control of PSC 104.

Operations 400 may be performed repeatedly over a time period during which contact tip 111 is moved from a first position separated from workpiece 114 to a second position that brings electrode tip 118 into direct contact with the workpiece at weld start to initiate an arc.

At 402, welding system 100 samples a sensed voltage indicative of the weld voltage provided to contact tip 111/electrode tip 118, to produce a sequence of voltage values. PSC 104 receives the voltage values.

At 404, PSC 104 computes a time derivative of the weld voltage. For example, welding system 100 computes a time derivative of the voltage values to produce a sequence of time derivative values of the voltage values (referred to simply as "voltage derivative values"). The voltage derivative values represent/are indicative of the voltage supplied to electrode 118 and the resistance between electrode tip 118 and workpiece 114. This resistance may also be referred to as a "contact resistance" or an "ohmic connection." PSC 104 may compute each voltage derivative value as a difference between a first voltage value (e.g., a first magnitude) and a second voltage value (e.g., a second magnitude) of the voltage values over a time separation between the voltage values (e.g., du/dt=difference of voltage values/time separation). The first voltage value and the second voltage value may be consecutive voltage values or may be separated from each other by multiple intermediate voltage values. In an example in which an ADC sample rate of 1 MHz generates consecutive voltage values every 1 usec, the first and second voltage values used to compute each voltage derivative value may be separated in time by approximately 100 usec, although the time separation may be decreased or increased depending on implementation. Welding system 100 may compute a new voltage derivative value for each new voltage value as each new voltage value is received.

At 406, PSC 104 determines whether each of the voltage derivative values across the sequence is either above or below a predetermined voltage derivative threshold (VDTH). For example, PSC 104 compares each of the voltage derivative values to the voltage derivative threshold. PSC 104 detects weld start as a decrease in the voltage derivative values from (i) first voltage derivative values that are above the voltage derivative threshold because the weld voltage is at or near an open-circuit voltage due to separation between electrode tip 118 and workpiece 114, to (ii) second voltage derivative values that are below the voltage derivative threshold because the weld voltage is a closed-circuit voltage due to contact between the electrode tip and the workpiece. The first voltage derivative values represent the resistance when it is not sufficiently low (i.e., is too high) to initiate the arc. In contrast, the second voltage derivative values represent the resistance when it is sufficiently low to strike the arc. The resistance that is sufficiently low is the resistance that indicates weld start.

Upon detecting weld start, PSC 104 immediately controls/commands power supply 102 to increase the weld power supplied to torch 110 rapidly in order to initiate the arc. To increase the weld power, PSC 104 may increase the duty cycle of PWM waveform 210 from a first duty cycle that is relatively low (e.g., 1%) during idle to a second duty cycle that is duty cycle (e.g., at or near 100%) that is greater than the first duty cycle for the weld operation.

In an embodiment, welding system 100 may qualify weld start. To do this, PSC 104 may detect weld start only when/after the voltage derivative values remain below the voltage derivative threshold in an uninterrupted manner for a predetermined time period. That is, prior to increasing the weld power, PSC 104 detects that the voltage derivative values remain below the time-derivative threshold in an uninterrupted manner for a predetermined time period.

The voltage derivative threshold may be considered a function of the resistance that is sufficiently low to strike an arc, i.e., that indicates/corresponds to weld start. For a given resistance that indicates weld start, there is a corresponding voltage derivative threshold. More generally, for a range of such resistances, there is a corresponding range of voltage derivative thresholds. Accordingly, in an embodiment, welding system 100 stores predetermined mappings between contact resistances that indicate weld start and corresponding voltage derivative thresholds. During operation, an operator may set or select, from the mappings, a resistance to be used to indicate weld start. Welding system 100 may then set the voltage derivative threshold corresponding to the set resistance based on the mappings. Alternatively, a given voltage derivative threshold may be derived analytically from a given contact resistance accessible to welding system 100.

Figure 5:
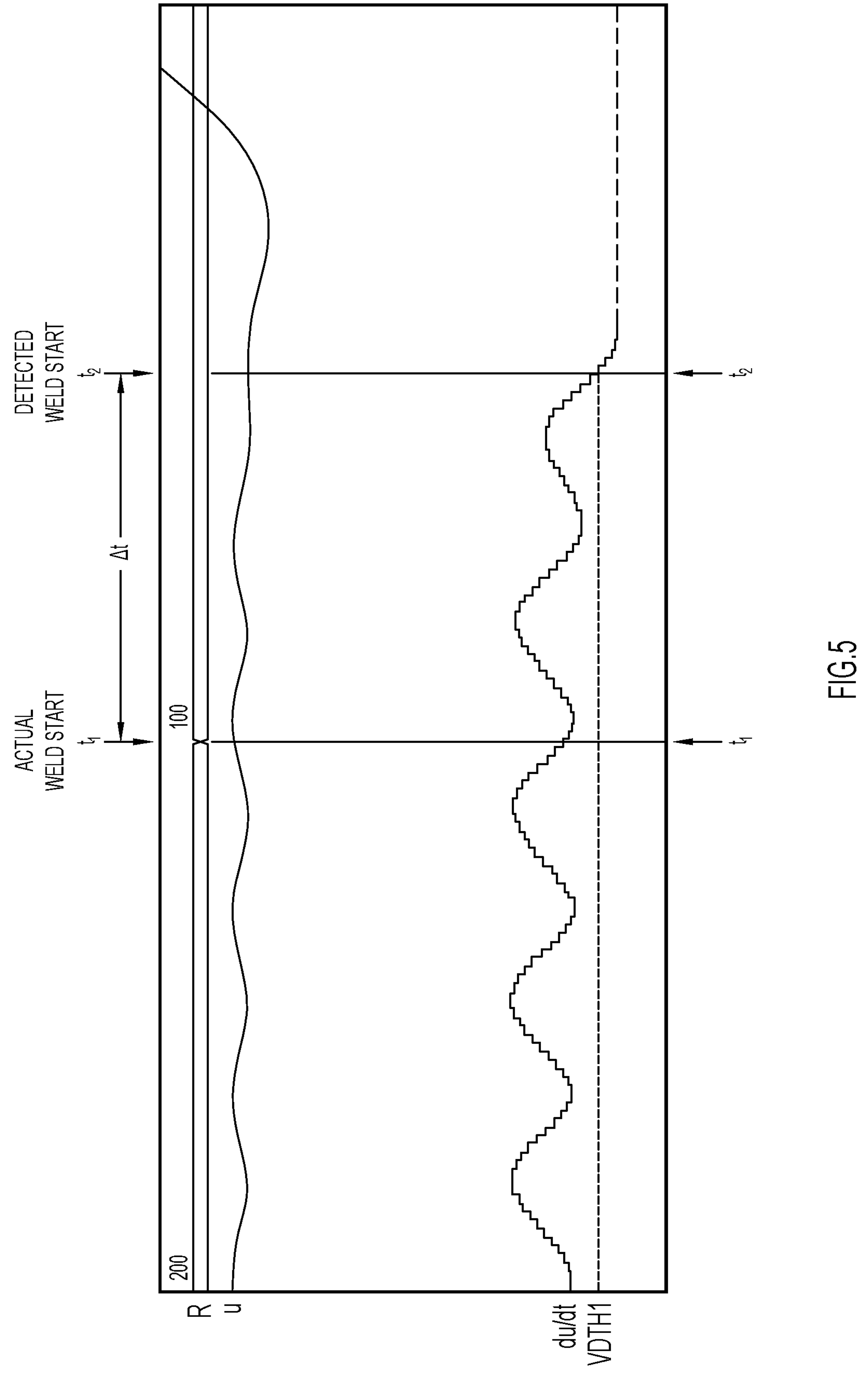
FIG. 5 shows first example waveforms associated with detecting weld start using voltage derivative values.

FIG. 5 shows first example waveforms associated with detecting weld start based on a first voltage derivative threshold (VDTH1) that corresponds to a first resistance (100 ohms) between electrode tip 118 and workpiece 114 and that is used to indicate weld start. From top to bottom, the waveforms include resistance R (i.e., the contract resistance) between electrode tip 118 and workpiece 114, weld voltage u (as indicated by the voltage values described above), and voltage derivative du/dt (as indicated by the voltage derivative values described above).

Traversing FIG. 5 in a direction of increasing time, up to time t1, due to separation between electrode tip 118 and workpiece 114, resistance R between the two is around 200 ohms, which is deemed too high to strike an arc. Weld voltage v is an idle voltage provided under the open-circuit condition.

At time t1, electrode tip 118 contacts workpiece 114 and resistance R drops to around 100 ohms, which is deemed sufficiently low to strike the arc (i.e., 100 ohms indicates actual weld start); however, the drop in resistance R to 100 ohms has not yet been detected by PSC 104.

After time t1, voltage u decreases slowly and gradually. Also, after time t1, voltage derivative du/dt remains above voltage derivative threshold VDTH1 (set in correspondence with weld start resistance R=100 ohms), but the voltage derivative du di decreases in a more pronounced or sharper manner than voltage u. Eventually, at time t2, voltage derivative du di falls from above voltage derivative threshold VDTH1 to below the voltage derivative threshold VDTH1, which indicates weld start. Thus, welding system 100 detects weld start at time t2. A time difference Δt=t2−t1 represents the time delay between when resistance R is actually sufficiently low to strike the arc (e.g., 100 ohms) and when that condition is detected by welding system 100. The pronounced manner in which voltage derivative du/dt falls provides a quicker and more consistently accurate indication of weld start than does voltage u. In the example of FIG. 5, PSC 104 detects weld start as du/dt corresponding to a voltage drop of approximately −4.7 V over a time period of 100 usec (as represented at VDTH1, for example), which limits Δt to around 43 usec. The foregoing example values are implementation specific and may vary substantially depending on the implementation. After the detection of weld start at time t2, voltage derivative du/dt can acquire different values depending on system conditions and is thus shown as a horizontal dashed line, with the understanding that du/dt may deviate from the dashed line.

Figure 6:
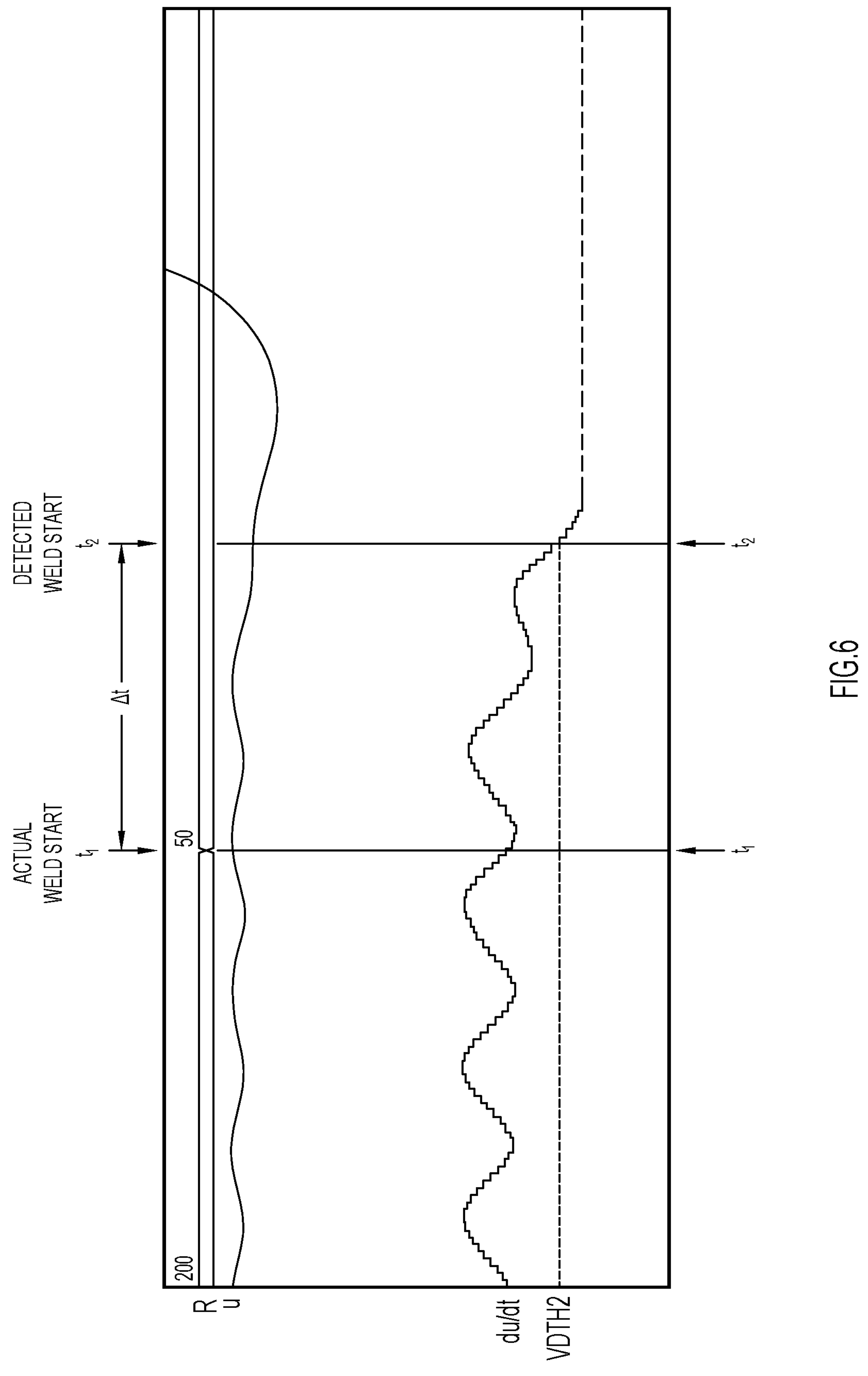
FIG. 6 shows second example waveforms associated with detecting weld start using the voltage derivative values.

FIG. 6 shows second example waveforms associated with detecting weld start based on a second voltage derivative threshold (VDTH2) that corresponds to a second resistance (50 ohms) between electrode tip 118 and workpiece 114 and that is used to indicate weld start. From top to bottom, the waveforms include resistance R, weld voltage u, and voltage derivative du/dt.

Up to time t1, due to separation between electrode tip 118 and workpiece 114, resistance R between the two is around 200 ohms, which is too high to strike an arc.

At time t1, electrode tip 118 contacts workpiece 114 and resistance R drops to around 50 ohms, which is deemed sufficiently low to strike the arc (i.e., 50 ohms indicates actual weld start); however, the drop in resistance R to 50 ohms has not yet been detected by PSC 104.

After time t1, voltage u decreases slowly and gradually. Also, after time t1, voltage derivative du/dt remains above voltage derivative threshold VDTH2 corresponding to resistance R=50 ohms, but the voltage derivative du/dt decreases in a more pronounced or exaggerated manner than voltage u. Finally, at time t2, voltage derivative du di falls from above voltage derivative threshold VDTH2 to below the voltage derivative threshold VDTH2, which indicates weld start. Thus, welding system 100 detects weld start at time t2. A time difference Δt=t2−t1 represents the time delay between when resistance R is actually sufficiently low to strike the arc (e.g., 50 ohms) and when that condition is detected by welding system 100. In the example of FIG. 5, PSC 104 detects weld start as a voltage drop of approximately −7.1 V over a time period of 100 usec (as represented at VDTH2, for example), which limits Δt to around 43 usec. The foregoing example values are implementation specific and may vary substantially depending on the implementation. After the detection of weld start at time t2, voltage derivative du/dt can acquire different values depending on system conditions and is thus shown as a horizontal dashed line, with the understanding that du/dt may deviate from the dashed line.

In some aspects, the techniques described herein relate to a method performed in a welding or cutting system configured to deliver weld power to an electrode tip extending from a torch to initiate an arc on a workpiece, including: sampling a sensed voltage indicative of a weld voltage provided to the electrode tip, to produce voltage values; computing a time derivative of the voltage values to produce voltage derivative values that represent a contact resistance between the electrode tip and the workpiece; and upon detecting a decrease in the voltage derivative values from above a time-derivative threshold to below the time-derivative threshold as an indication of a weld start, increasing the weld power supplied to the electrode tip to initiate the arc on the workpiece.

In some aspects, the techniques described herein relate to a method, wherein: detecting the decrease indicates that the contact resistance is sufficiently low to initiate the arc.

In some aspects, the techniques described herein relate to a method, further including: performing sampling, computing, and detecting repeatedly over a time period in which the electrode tip is moved from a first position separated from the workpiece to a second position in contact with the workpiece.

In some aspects, the techniques described herein relate to a method, wherein: detecting includes detecting the decrease in the voltage derivative values from (i) first voltage derivative values that are above the time-derivative threshold because the weld voltage is an open-circuit voltage due to the electrode tip being separated from the workpiece, to (ii) second voltage derivative values that are below the time-derivative threshold because the weld voltage is a closed-circuit voltage due to contact between the electrode tip and the workpiece.

In some aspects, the techniques described herein relate to a method, wherein: detecting further includes detecting the decrease in the voltage derivative values from (i) first voltage derivative values that are above the time-derivative threshold and represent that the contact resistance is too high to initiate the arc, to (ii) second voltage derivative values that are below the time-derivative threshold and represent that the contact resistance is sufficiently low to initiate the arc.

In some aspects, the techniques described herein relate to a method, wherein: detecting includes repeatedly comparing the voltage derivative values to the time-derivative threshold.

In some aspects, the techniques described herein relate to a method, further including: prior to increasing the weld power, detecting that the voltage derivative values remain below the time-derivative threshold in an uninterrupted manner for a predetermined time period.

In some aspects, the techniques described herein relate to a method, wherein the welding or cutting system includes a power supply configured to generate the weld power responsive to pulse width modulation that is applied to the power supply, wherein: increasing the weld power includes increasing a duty cycle of the pulse width modulation from a first duty cycle to a second duty cycle that is greater than the first duty cycle.

In some aspects, the techniques described herein relate to a method, wherein: computing includes computing each voltage derivative value based on a difference between a first voltage value and a second voltage value of the voltage values and a time difference between the first voltage value and the second voltage value.

In some aspects, the techniques described herein relate to a method, wherein the welding or cutting system is configured to perform one of metal inert gas (MIG) welding, metal active gas (MAG) welding, tungsten inert gas (TIG) welding, flux cored arc welding (FCAW), shielded metal arc welding (SMAW), and submerged arc welding (SAW).

In some aspects, the techniques described herein relate to an apparatus for welding or cutting including: a power supply configured to provide weld power to an electrode tip extending from a torch to initiate an arc on a workpiece; and a controller coupled to the power supply and configured to perform: receiving voltage values indicative of a weld voltage provided to the electrode tip by the power supply; computing a time derivative of the voltage values to produce voltage derivative values that represent a contact resistance between the electrode tip and the workpiece; and upon detecting a decrease in the voltage derivative values from above a time-derivative threshold to below the time-derivative threshold as an indication of a weld start, controlling the power supply to increase the weld power supplied to the electrode tip to initiate the arc on the workpiece.

In some aspects, the techniques described herein relate to an apparatus, wherein: the decrease in the voltage derivative values from above the time-derivative threshold to below the time-derivative threshold indicates that the contact resistance is sufficiently low to initiate the arc.

In some aspects, the techniques described herein relate to an apparatus, wherein the controller is further configured to perform: sampling, computing, and detecting repeatedly over a time period in which the electrode tip is moved from a first position separated from the workpiece to a second position in contact with the workpiece.

In some aspects, the techniques described herein relate to an apparatus, wherein: the controller is configured to perform detecting by detecting the decrease in the voltage derivative values from (i) first voltage derivative values that are above the time-derivative threshold because the weld voltage is an open-circuit voltage due to the electrode tip being separated from the workpiece, to (ii) second voltage derivative values that are below the time-derivative threshold because the weld voltage is a closed-circuit voltage due to contact between the electrode tip and the workpiece.

In some aspects, the techniques described herein relate to an apparatus, wherein: the controller is configured to perform detecting by detecting the decrease in the voltage derivative values from (i) first voltage derivative values that are above the time-derivative threshold and represent that the contact resistance is too high to initiate the arc, to (ii) second voltage derivative values that are below the time-derivative threshold and represent that the contact resistance is sufficiently low to initiate the arc.

In some aspects, the techniques described herein relate to an apparatus, wherein: the controller is configured to perform detecting by repeatedly comparing the voltage derivative values to the time-derivative threshold.

In some aspects, the techniques described herein relate to an apparatus, wherein the controller is further configured to perform: prior to increasing the weld power, detecting that the voltage derivative values remain below the time-derivative threshold in an uninterrupted manner for a predetermined time period.

In some aspects, the techniques described herein relate to an apparatus, wherein: the power supply is configured to provide the weld power responsive to pulse width modulation that is applied to the power supply by the controller; and the controller is configured to perform generating the pulse width modulation and to perform increasing the weld power by increasing a duty cycle of the pulse width modulation from a first duty cycle to a second duty cycle that is greater than the first duty cycle.

In some aspects, the techniques described herein relate to an apparatus, wherein: The controller performs computing by computing each voltage derivative value based on a difference between a first voltage value and a second voltage value of the voltage values and a time difference between the first voltage value and the second voltage value.

In some aspects, the techniques described herein relate to an apparatus, wherein the apparatus is configured to perform one of metal inert gas (MIG) welding, metal active gas (MAG) welding, tungsten inert gas (TIG) welding, flux cored arc welding (FCAW), shielded metal arc welding (SMAW), and submerged arc welding (SAW).

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed in a welding or cutting system configured to deliver weld power to an electrode tip extending from a torch to initiate an arc on a workpiece, comprising:

sampling a sensed voltage indicative of a weld voltage provided to the electrode tip, to produce voltage values;

computing a time derivative of the voltage values to produce voltage derivative values that represent a contact resistance between the electrode tip and the workpiece;

detecting a weld start by detecting a decrease in the voltage derivative values from above to below a time-derivative threshold, the time-derivative threshold being a predetermined value that is mapped to a corresponding predetermined value of contact resistance; and increasing the weld power supplied to the electrode tip to initiate the arc on the workpiece.

2. The method of claim 1, wherein:

detecting the decrease indicates that the contact resistance is sufficiently low to initiate the arc.

3. The method of claim 1, further comprising:

performing sampling, computing, and detecting repeatedly over a time period in which the electrode tip is moved from a first position separated from the workpiece to a second position in contact with the workpiece.

4. The method of claim 1, wherein:

detecting includes detecting the decrease in the voltage derivative values from (i) first voltage derivative values that are above the time-derivative threshold because the weld voltage is an open-circuit voltage due to the electrode tip being separated from the workpiece, to (ii) second voltage derivative values that are below the time-derivative threshold because the weld voltage is a closed-circuit voltage due to contact between the electrode tip and the workpiece.

5. The method of claim 1, wherein:

detecting further includes detecting the decrease in the voltage derivative values from (i) first voltage derivative values that are above the time-derivative threshold and represent that the contact resistance is too high to initiate the arc, to (ii) second voltage derivative values that are below the time-derivative threshold and represent that the contact resistance is sufficiently low to initiate the arc.

6. The method of claim 1, wherein:

detecting includes repeatedly comparing the voltage derivative values to the time-derivative threshold.

7. The method of claim 1, further comprising:

prior to increasing the weld power, detecting that the voltage derivative values remain below the time-derivative threshold in an uninterrupted manner for a predetermined time period.

8. The method of claim 1, wherein the welding or cutting system includes a power supply configured to generate the weld power responsive to pulse width modulation that is applied to the power supply, wherein:

increasing the weld power includes increasing a duty cycle of the pulse width modulation from a first duty cycle to a second duty cycle that is greater than the first duty cycle.

9. The method of claim 1, wherein:

computing includes computing each voltage derivative value based on a difference between a first voltage value and a second voltage value of the voltage values and a time difference between the first voltage value and the second voltage value.

10. The method of claim 1, wherein the welding or cutting system is configured to perform one of metal inert gas (MIG) welding, metal active gas (MAG) welding, tungsten inert gas (TIG) welding, flux cored arc welding (FCAW), shielded metal arc welding (SMAW), and submerged arc welding (SAW).

11. An apparatus for welding or cutting comprising:

a power supply configured to provide weld power to an electrode tip extending from a torch to initiate an arc on a workpiece; and a controller coupled to the power supply and configured to perform:

receiving voltage values indicative of a weld voltage provided to the electrode tip by the power supply;

computing a time derivative of the voltage values to produce voltage derivative values that represent a contact resistance between the electrode tip and the workpiece;

detecting a weld start by detecting a decrease in the voltage derivative values from above to below a time-derivative threshold, the time-derivative threshold being a predetermined value that is mapped to a corresponding predetermined value of contact resistance; and increasing the weld power supplied to the electrode tip to initiate the arc on the workpiece.

12. The apparatus of claim 11, wherein:

the decrease in the voltage derivative values from above the time-derivative threshold to below the time-derivative threshold indicates that the contact resistance is sufficiently low to initiate the arc.

13. The apparatus of claim 11, wherein the controller is further configured to perform:

sampling, computing, and detecting repeatedly over a time period in which the electrode tip is moved from a first position separated from the workpiece to a second position in contact with the workpiece.

14. The apparatus of claim 11, wherein:

the controller is configured to perform detecting by detecting the decrease in the voltage derivative values from (i) first voltage derivative values that are above the time-derivative threshold because the weld voltage is an open-circuit voltage due to the electrode tip being separated from the workpiece, to (ii) second voltage derivative values that are below the time-derivative threshold because the weld voltage is a closed-circuit voltage due to contact between the electrode tip and the workpiece.

15. The apparatus of claim 11, wherein:

the controller is configured to perform detecting by detecting the decrease in the voltage derivative values from (i) first voltage derivative values that are above the time-derivative threshold and represent that the contact resistance is too high to initiate the arc, to (ii) second voltage derivative values that are below the time-derivative threshold and represent that the contact resistance is sufficiently low to initiate the arc.

16. The apparatus of claim 11, wherein:

the controller is configured to perform detecting by repeatedly comparing the voltage derivative values to the time-derivative threshold.

17. The apparatus of claim 11, wherein the controller is further configured to perform:

prior to increasing the weld power, detecting that the voltage derivative values remain below the time-derivative threshold in an uninterrupted manner for a predetermined time period.

18. The apparatus of claim 11, wherein:

the power supply is configured to provide the weld power responsive to pulse width modulation that is applied to the power supply by the controller; and the controller is configured to perform generating the pulse width modulation and to perform increasing the weld power by increasing a duty cycle of the pulse width modulation from a first duty cycle to a second duty cycle that is greater than the first duty cycle.

19. The apparatus of claim 11, wherein:

the controller performs computing by computing each voltage derivative value based on a difference between a first voltage value and a second voltage value of the voltage values and a time difference between the first voltage value and the second voltage value.

20. The apparatus of claim 11, wherein the apparatus is configured to perform one of metal inert gas (MIG) welding, metal active gas (MAG) welding, tungsten inert gas (TIG) welding, flux cored arc welding (FCAW), shielded metal arc welding (SMAW), and submerged arc welding (SAW).

* * * * *